US 7,069,426 B1

(12) United States Patent
Hummel

(10) Patent No.: US 7,069,426 B1
(45) Date of Patent: Jun. 27, 2006

(54) BRANCH PREDICTOR WITH SATURATING COUNTER AND LOCAL BRANCH HISTORY TABLE WITH ALGORITHM FOR UPDATING REPLACEMENT AND HISTORY FIELDS OF MATCHING TABLE ENTRIES

(75) Inventor: Vincent E. Hummel, Cambridge, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/535,765

(22) Filed: Mar. 28, 2000

(51) Int. Cl.
  *G06F 9/32* (2006.01)
(52) U.S. Cl. ............................................ 712/240
(58) Field of Classification Search ................ 712/233, 712/238, 239, 240
  See application file for complete search history.

(56) References Cited

U.S. PATENT DOCUMENTS

| | | | |
|---|---|---|---|
| 5,758,142 A | 5/1998 | McFarling et al. | |
| 5,805,878 A * | 9/1998 | Rahman et al. | 712/239 |
| 5,842,008 A * | 11/1998 | Gochman et al. | 712/240 |
| 6,151,672 A * | 11/2000 | Hunt | 712/239 |
| 6,332,189 B1 * | 12/2001 | Baweja et al. | 712/238 |
| 6,374,349 B1 * | 4/2002 | McFarling | 712/239 |
| 6,550,004 B1 * | 4/2003 | Henry et al. | 712/239 |
| 6,601,161 B1 * | 7/2003 | Rappoport et al. | 712/238 |

OTHER PUBLICATIONS

Hennessy and Patterson, Computer Architecture—A Quantitative Approach, 2nd Edition, p. 162, 163, and 167.*
Driesen et al., "The Cascaded Predictor: Economical and Adaptive Branch Target Predictive," Dec. 1998, pp. 1-10.*
T. Yeh & Y. N. Patt, "Alternative Implementations of Two-Level Adaptive Branch Prediction", Proc. 19th Symposium on Computer Architecture (May 1992), Gold Coast, Australia, pp. 124-134.
J. L. Hennessy & D. A. Patterson, "Computer Architecture A Quantitative Approach", 2d Edition, pp. 262-271.

* cited by examiner

*Primary Examiner*—Eddie Chan
*Assistant Examiner*—David J. Huisman
(74) *Attorney, Agent, or Firm*—Blakely, Sokoloff, Taylor & Zafman LLP

(57) ABSTRACT

An embodiment of the invention is directed to a dynamic branch prediction method in which a first taken/not-taken prediction is provided responsive to an address using a saturating counter branch predictor. A second taken/not-taken prediction responsive to the address resulting in a hit in a local branch history table is provided. In addition, a hit/miss indication for the address is provided. The second prediction is selected for the address if the indication is a hit, and the first prediction is selected if the indication is a miss.

17 Claims, 4 Drawing Sheets

BRANCH PREDICTOR WITH SATURATING COUNTER AND LOCAL BRANCH HISTORY TABLE WITH ALGORITHM FOR UPDATING REPLACEMENT AND HISTORY FIELDS OF MATCHING TABLE ENTRIES

FIELD OF THE INVENTION

This invention is generally related to pipelined processors and more particularly to branch prediction methodologies implemented in such processors.

BACKGROUND

Advanced processors use pipelining techniques to execute instructions at very high speeds. A pipeline is like an assembly line. In an automobile assembly line, there are many steps, each contributing to the construction of the car. Each step operates in parallel with the other steps, though on a different car. In a processor pipeline, each step completes a part of an instruction. Like the assembly line, different steps are completing different parts of different instructions in parallel. Each of these steps is called a pipe stage. The stages are connected one to the next to form a pipe where instructions enter at one end, progress through the stages, and exit at the other end. A pipeline is most effective if it can process a steady stream of instructions in a sequential manner.

When a branch is executed, it may change the instruction pointer (IP) to something other than its current value plus a predetermined fixed increment. If a branch changes the IP to the address of the branch target (given by the branch instruction), it is a "taken" branch. If it falls through, it is "not taken". Knowledge of whether the branch will be taken or not, and the address of the branch target, typically becomes available when the instruction has reached the last or next to last stage of the pipe. This means that all instructions that issued later than the branch- and hence not as far along in the pipe as the branch—are invalid, i.e. they should not be executed, if the branch is taken, because the next instruction to be executed following the branch is the one at the target address. All of the time spent by the pipeline on the later issued instructions is wasted delay, thus significantly reducing the speed improvement that can be obtained from the pipeline. To alleviate the delay that may be caused by the branch, there are two steps that can be taken. First, find out whether the branch will be taken or not taken (the "direction" of the branch) earlier in the pipeline. Second, compute the target address earlier.

One method for dealing with branches is to use hardware inside the processor to predict whether an address will result in a branch instruction being taken or not taken. Examples of such hardware include the 2-bit saturating counter predictor (see "Computer Architecture A Quantitative Approach", David A. Patterson and John L. Hennessy, 2d Edition, Morgan Kauffman Publishers, pp. 262–271,) and the local history predictor which uses the past behavior (taken/not-taken) of a particular branch instruction to predict future behavior of the instruction. The use of a combination of two different predictors has been proposed to obtain more accurate predictions, where in U.S. Pat. No. 5,758,142 the final prediction at the output of a multiplexer is selected between a prediction provided using a branch past history table and one provided using a global branch history table, where the selection is made according to the most significant bit of a counter. Another technique uses the combination of the local history predictor and the saturating counter predictor to achieve more accurate predictions than either one can by itself, by using the branch history (obtained from a matching entry in a local history table) to index into a pattern history table, where the next execution of a branch is finally predicted by the value of a 2-bit saturating counter predictor. See article by T. Yeh and Y. N. Patt, "Alternative Implementations of Two-Level Adaptive Branch Prediction", Proc. 19th Symposium on Computer Architecture (May 1992) Gold Coast, Australia 124–134. Implementation of both of these techniques, however, requires a relatively large area on the processor chip.

BRIEF DESCRIPTION OF THE DRAWINGS

The invention is illustrated by way of example and not by way of limitation in the figures of the accompanying drawings in which like references indicate similar elements and in which.

DETAILED DESCRIPTION

The invention provides techniques for predicting the direction of a branch (taken or not taken) with relatively high accuracy and less on-chip area. The invention combines two types of predictors, a saturating counter branch predictor and a local branch history predictor, to provide an accurate prediction of the direction of a branch, based upon an address. The local history predictor has a local history table that includes an array of branch histories. If the local history table has a hit for the address, then its matching branch history is used to derive the final prediction. If the address results in a miss, then the output of the saturating counter branch predictor is used as the final prediction.

In a particular embodiment of the invention, the history field of a given entry in the local history table is updated with the outcome of an executed branch only if the local history predictor had yielded a correct prediction for the branch and the saturating counter predictor did not. In addition, a replacement field for a matching entry in the local history table is updated, only if the saturating counter prediction was incorrect. Such a scheme for populating the local history table provides for a more efficient utilization of the structure. There is a beneficial trade-off of area and performance for a certain set of applications. In particular, the predictor described provides a reasonable prediction for a large number of branches, using the saturating counter, and a more accurate prediction for a smaller number of branches, using the local branch history table. The accuracy of the local branch history table is not as high as a dynamically maintained local history table. However, the area not used in the dynamic table is used for the saturating counter, yielding a better overall predictor for programs with a large number of branches. In certain embodiments of the invention, the final prediction accuracy is comparable to the Yeh-Patt methodology discussed in the background, while using less on-chip area. This provides the advantage that a greater number of branches may be tracked than using the conventional branch prediction methodologies, without increasing the on-chip area used by the branch direction predictor.

Figure 1:
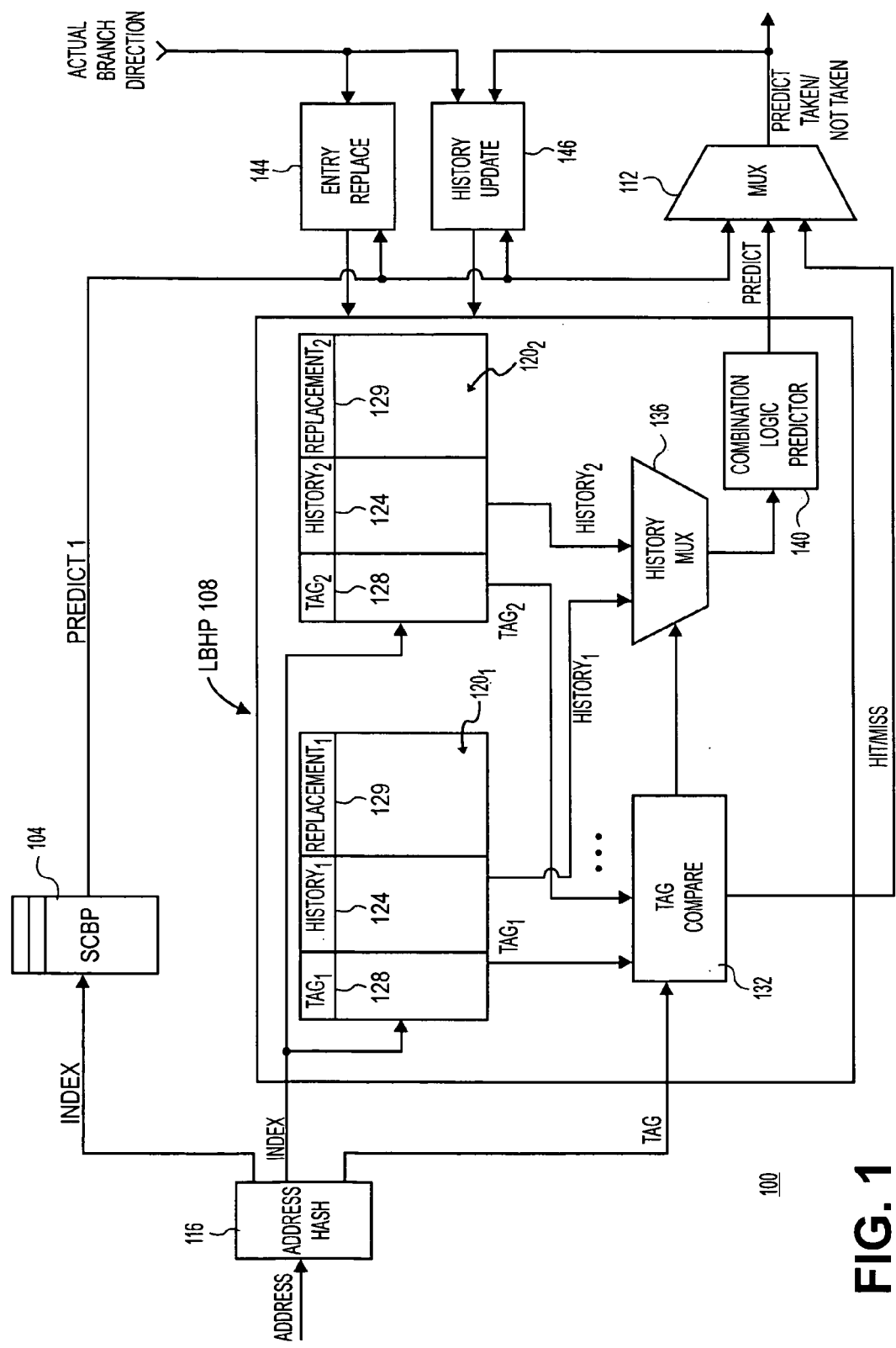
FIG. 1 illustrates a block diagram of branch prediction logic according to an embodiment of the invention.

FIG. 1 illustrates a block diagram of branch direction prediction logic 100 according to an embodiment of the invention. A saturating counter branch prediction (SCBP) logic 104 and local branch history prediction (LBHP) logic 108 are provided on-chip in a processor. The SCBP 104 has an input that is coupled to receive an index value derived from an address. A first taken/not-taken prediction is provided at the output of the SCBP 104 responsive to the address. Similarly, the LBHP has an input coupled to receive an index value derived from the address. The LBHP 108 is capable of providing a second taken/not-taken prediction at an output responsive to the address resulting in a hit. A hit/miss indication is also provided by the LBHP 108 for the address. A multiplexer 112 has its inputs coupled to the outputs of the SCBP 104 and LBHP 108. In this embodiment of the invention, the multiplexer 112 has two single-line inputs one from each predictor logic, and one single-line output that provides the final taken/not-taken prediction. A select input of the multiplexer, in this case being a single line, is coupled to receive the hit/miss indication from the LBHP 108. The hit/miss indication thus selects either (1) the second prediction if there is a hit or (2) the first prediction if there is a miss.

In the particular embodiment of the branch prediction logic 100 shown in FIG. 1, the index values that are input to the SCBP 104 and LBHP 108 are obtained from address hash logic 116 which is coupled to an instruction pointer (IP) generator (not shown in FIG. 1). The address hash logic 116 provides a number of index values to the SCBP and LBHP logic based upon an input address received from the IP generator. The address hash logic 116 is only one example of what is in general any encoding or compression scheme that helps make more efficient use of the relatively large number of bits in the address space of modern pipelined processors. For instance, if the address space is 64 bits wide, then the use of an encoding or compression scheme such as the address hash logic 116 generally allows a many-to-one mapping of several address values to a single index value. This, of course, means that each index value may represent several branch instructions. Such aliasing of the prediction mechanism may be tolerated as otherwise a prohibitively large local history table may be needed to separately track any branch instructions located at a given address value.

Figure 2:
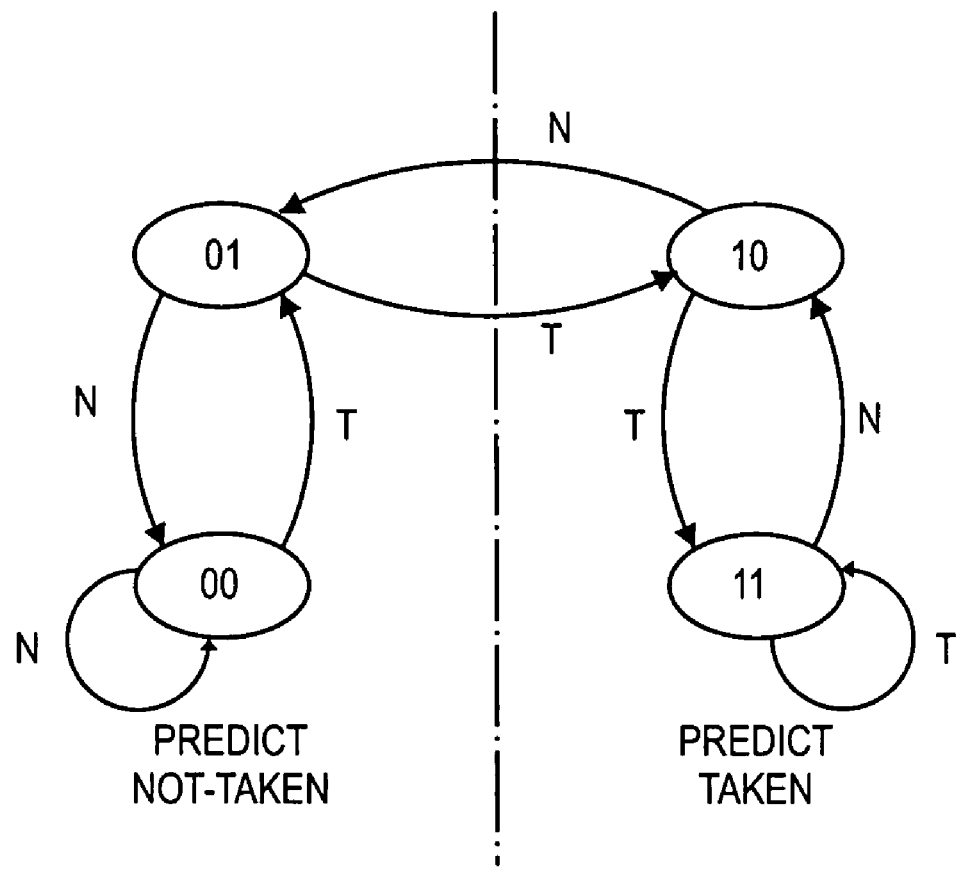
FIG. 2 shows a state diagram of a saturating counter branch predictor.

In a particular embodiment of the invention, the SCBP 104 includes an array of 2-bit predictors, one predictor for each index value. FIG. 2 illustrates the state diagram of a 2-bit predictor. The predictor has four states, defined by two bits in a counter. The counter transitions from one state to another in response to a taken (T) or not-taken (N) outcome resulting from the execution of one or more branch instructions that are assigned to the index value of the predictor. The 2-bit predictor will always provide a prediction as to the direction of a branch, where if the counter is in states 01 or 00 the branch is predicted as N, while in states 10 and 11 the prediction is T. Although a 2-bit predictor is shown in the SCBP 104 of FIG. 1, in general saturating counters having greater than two bits may be used in the SCBP 104, although the benefits gained from using a greater number of bits in the counter may not outweigh the increased complexity and on chip area required by the resulting logic.

The LBHP 108 shown in FIG. 1 includes a number of local branch history tables 120, where "local" refers to the accumulation of history (taken or not-taken) in each entry, that is specific to one or more branch instructions referenced by the index value of that entry. Each table entry has a tag field 128 and a history field 124, in addition to others not shown. The history field 124 contains a series of taken or not-taken outcomes of one or more previously executed branch instructions that are associated with a unique tag value in the corresponding tag field 128 and an index value that is shared by all of the tables. The branch instructions may have been in the current program being executed, or they may have been part of a previously executed routine. For N local history tables, each index value looks up N tag-history entries where each entry corresponds to at least one branch instruction. This means that the configuration of FIG. 1 can support, for each index value, separate histories for N distinct branch instructions. In a particular embodiment of the invention, all of these N branch instructions have the same lower (least significant) bits in their address values. See FIG. 3 momentarily for an example of a mapping of these lower bits into the same index value.

The tables 120 are designed so that the index provided by the hash logic 116 preferably always matches that of an entry in each table 120. The tag value and the history value of the matching entry from each table 120 are provided to tag compare logic 132. The tags are then compared to a tag value derived from the address, by address hash logic 116. If one of the tags received from the tables 120 matches that derived from the address, then a "hit" is declared signifying that one of the tables 120 contains a taken/not-taken history of one or more branch instructions pointed to by the address. If a "miss" is declared, then the instructions pointed to by the address have no branch history within the tables 120. This hit or miss indication is used to select either the saturating counter prediction or the local history prediction to be the final prediction of the branch direction prediction logic 100 for the current address.

The history field corresponding to the matching tag field is selected by the tag compare logic 132 using a history multiplexer 136 and provided to combinational logic predictor 140. The combinational logic predictor 140 implements a decision function whose output is either a taken or not-taken prediction based on the history value that has been provided to it. To help keep the on-chip area taken by the branch prediction logic 100 to a minimum, the combinational logic predictor 140 may have no memory, meaning that it does not have a counter or other state machine, and may simply be a combination of logic gates that are predetermined at the time the processor is built to generate a prediction based upon the taken/not-taken history that is provided to it.

The entries in the tables 120 of the LBHP 108 may be filled and updated while the processor is executing a test program or the actual program for which predictions are being made by the branch prediction logic 100. Whenever the processor is to execute a new program, the local history tables 120 may be wiped clean and refilled with new tag and history field values that are better suited to the new program, while the predictors in the SCBP 104 remain unchanged.

A new entry to the table 120 may be added when the prediction from SCBP 104 is incorrect. This procedure is controlled by entry replace logic 144 seen in FIG. 1 which receives the actual branch direction of an executed branch from later stages of a pipeline (see FIG. 4 discussed below.) A least recently used (LRU) algorithm may be employed to determine which is the existing entry to be replaced, although the invention need not be limited to any particular replacement algorithm.

The history field 124 of an existing entry is updated with a new direction outcome of an executed branch. The replacement field 129 for this entry is updated if the prediction by the SCBP 104 was incorrect. If the prediction was correct, then the replacement field 129 is not updated which indicates the entry was not used. Such a functionality is implemented by history update logic 146. This gives a better utilization of the local history tables 120 because in this way the tables 120 are used only for compensating any mispredictions generated by the SCBP 104. If the predictions by the SCBP 104 remain accurate, then the replacement fields 129 of the LBHP 108 are not updated, thus allowing other branches to occupy the LBHP, which in turn means more efficient use of the on-chip area taken by the LBHP 108.

Figure 3:
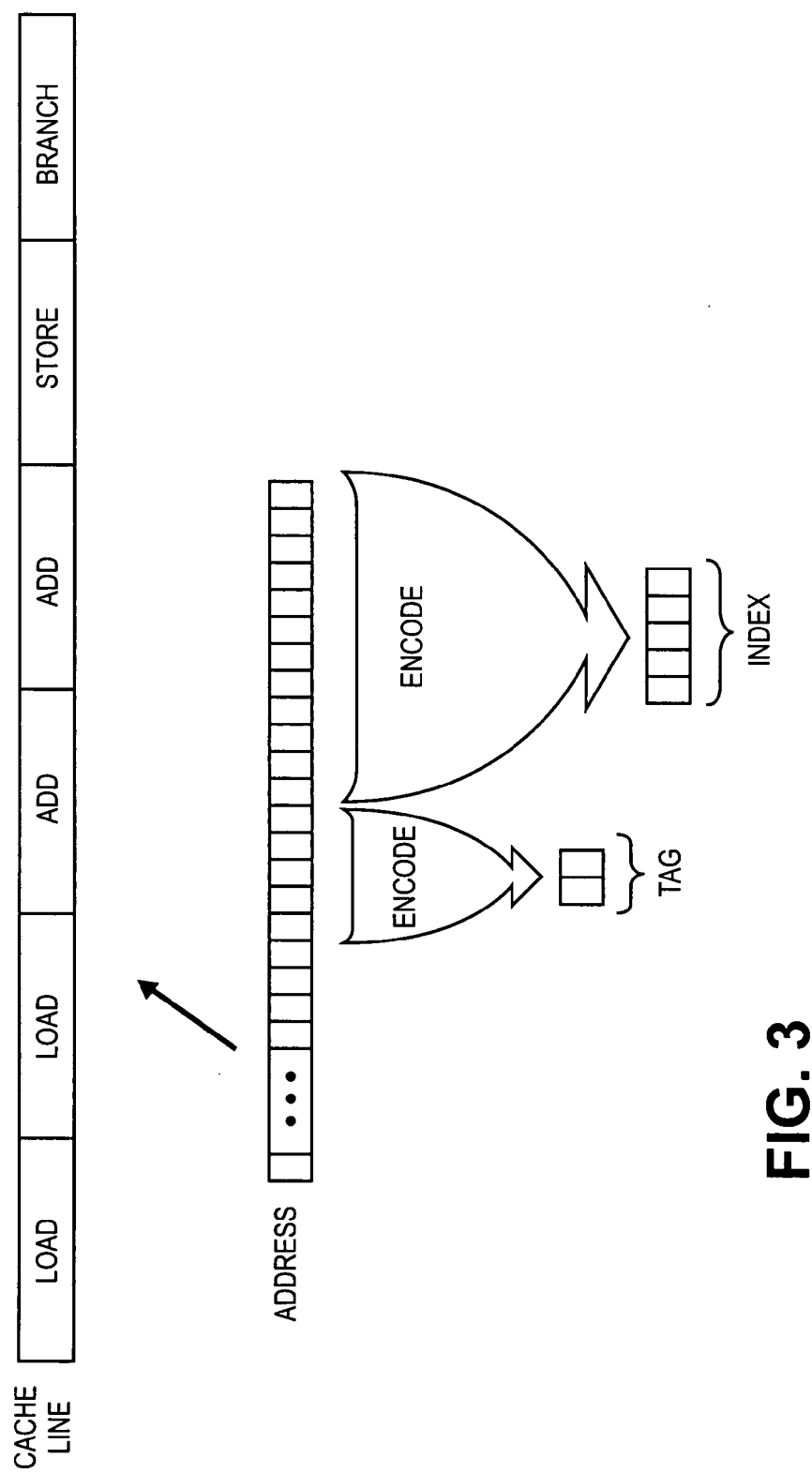
FIG. 3 illustrates the relationship between an address, the instructions to which the address points, and the generation of an index and tag value.

FIG. 3 illustrates using an example of the relationship between an address value and one or more instructions to which the address value points. It should be noted that the illustration is just one implementation of the hashing function used to encode bits in the address. In general, the encoded bits may come from anywhere in the address bits, not just the ones depicted in the figure. As was mentioned earlier, the address space of the pipelined processor may be relatively wide such that a large number of bits are used to derive the index value as well as the tag value. The tag concept is useful here because it allows a single branch instruction that may be part of multiple instructions within a cache line pointed to by the address to be extracted and uniquely identified by a unique tag. In general, tags provide a mechanism for uniquely identifying whether or not there is a branch at the address. If there are additional branch instructions within the same cache line, then these additional branch instructions may be assigned different tag values or additional offset values, yet all of these branch instructions in the same cache line will have the same index value. This is also a situation in which the address value may be hashed to derive the tag and index values that are fed to the SCBP and the LBHP logic (see FIG. 1 momentarily). This is only one of several techniques that may be used to index into the SCBP and LBHP logic. As an alternative to using an encoding scheme to generate the index and the tag values, bits in the address value may be directly applied to index the local history tables 120 or the saturating counter predictor array in the SCBP logic. In addition, although in FIG. 1 the address hash logic provides separate index values to the SCBP 104 and the LBHP 108, it may be possible to have only a common set of index values that are used by both SCBP 104 and the LBHP 108.

Figure 4:
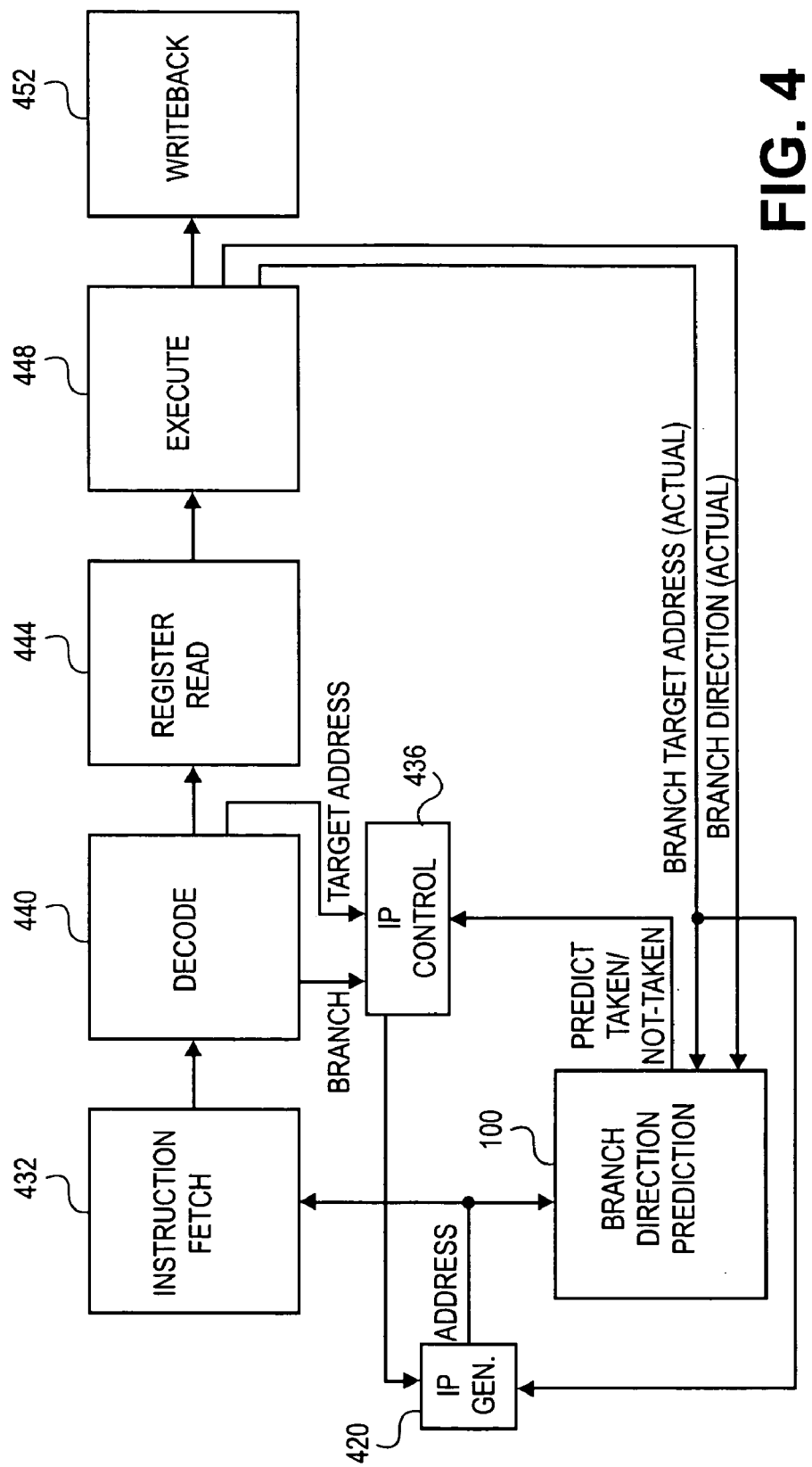
FIG. 4 is a block diagram of part of a pipelined processor featuring branch direction prediction logic.

Turning now to FIG. 4, a block diagram of a pipelined processor that includes the branch prediction logic 100 is shown. In this embodiment of the invention, the pipeline has five stages although the invention is not limited to any particular number of stages or types of stages in a pipeline. The branch prediction logic 100 receives an address value from an IP generator 420 and immediately thereafter provides a taken/not-taken prediction. This taken/not-taken prediction may become available as soon as the address value is fed to the first stage of the pipeline, namely the instruction fetch stage 432. In the instruction fetch stage 432, one or more instructions at the address received from the IP generator 420 (the address for which a branch prediction was just made) are fetched from memory (not shown). It may be that one or none of these instructions that have been fetched is a branch instruction. The determination as to whether or not any of these fetched instructions is a branch, whether the branch is taken or not-taken, and the identity of the branch target address will not be available until the instructions have propagated through the later stages in the pipeline.

The taken/not-taken prediction is provided to IP control logic 436 which then uses this information to update the address provided by the IP generator 420. If T (taken) is predicted, then a target address determined by the decode stage 440 of the pipeline is loaded into the IP generator 420, so that the next instruction to be fetched for the pipeline will be from the target address.

The decode stage 440 of the pipeline is responsible for decoding the instruction which has been fetched from the current address. The instruction set of certain pipelined processors allows the target address of a branch instruction to be determined by the decode stage 440, without having to wait for the instruction to propagate through later stages of the pipeline. In the processor shown in FIG. 4, these later stages include register read 444 responsible for reading the contents of the registers that have been specified by the instruction, and execute stage 448 in which the instructions are actually executed to yield results, and finally a writeback stage 452 in which the result is written to cache memory. In many instances, the outcome of a branch instruction, including its direction (whether taken or not) and the branch target address, become available at the output of the execute stage 448. This information is fed back to the branch direction predictor logic 100 to update the local history tables (see FIG. 1 momentarily) and to the IP generator 420.

In the pipeline shown in FIG. 4, the direction prediction at the output of branch prediction logic 100 is available when the instruction pointed to by the address has been fetched and is provided to the decode stage 440. The prediction should be available no later than the point in time at which the target address has been determined by the decode stage 440, so that the IP generator 420 can be properly instructed, i.e. whether to change the address value by a predetermined increment or change it to the target address.

The branch prediction technique described here advantageously helps reduce the misdirect penalty by identifying non-branches, which are predicted taken by the saturation counter, early in the pipe. The decode stage 440 may determine whether the instruction which was predicted taken is actually a branch. If it is not, the instructions in the earlier states are removed, the instruction pointer is reset to the address following the non-branch which was misdirected, and the IP control block 436 accepts the prediction from branch direction prediction 100. Note that this mechanism is not necessary for proper functionality, but its presence increases performance and supports the performance/area argument mentioned earlier.

To summarize, various embodiments of the invention have been described that are directed to improved branch direction prediction methodologies implemented in pipelined processors. The invention uses less on-chip area than other hardware-based local history predictors, while maintaining a comparable prediction accuracy. This allows the invention to track and predict a greater number of branches for the same area as a conventional predictor.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   providing a first taken/not-taken prediction responsive to an address using a saturating counter branch predictor;

providing (1) a second taken/not-taken prediction responsive to the address resulting in a hit in a local branch history table, and (2) a hit/miss indication for the address, wherein the second prediction is generated by a decision function that accepts, as an input, a history value from a matching entry of the local branch history table and produces, as an output, the second prediction, the decision function being implemented by combinational logic that has no memory so as to reduce on-chip area;

selecting for the address one of (1) the second prediction if the indication is a hit, and (2) the first prediction if the indication is a miss;

updating a replacement field for the matching entry in the local branch history table only if the first prediction was incorrect; and updating a history field for the matching entry in the local branch history table with the outcome of an executed branch instruction only if the first prediction was incorrect and the second prediction was correct.

2. The method of claim 1 further comprising:

hashing the address prior to indexing at least one of the saturating counter branch predictor and the local branch history table.

3. The method of claim 1 further comprising:

fetching at least one instruction at the address, where if the instruction is a branch, a determination as to whether the branch is taken or not-taken will not be available until the instruction has progressed beyond a decode stage; and decoding the at least one instruction, wherein at least one of the first and second predictions is available when the at least one instruction is being decoded.

4. The method of claim 3 wherein the at least one instruction is a branch, the method further comprising:

determining a target address of the branch; and loading an instruction pointer generator with the target address if at least one of the first and second predictions indicates that the branch is to be taken.

5. A processor comprising:

an instruction pointer (IP) generator capable of providing an address;

saturating counter branch prediction (SCBP) logic having an input coupled to the IP generator and capable of providing a first taken/not-taken prediction at an output responsive to the address;

local branch history prediction (LBHP) logic having an input coupled to the IP generator and capable of providing (1) a second taken/not-taken prediction at an output responsive to the address resulting in a hit, and (2) a hit/miss indication for the address, wherein the LBHP logic includes (1) at least one local branch history table to provide a taken/not-taken history from a matching entry in said table in response to said hit and (2) combinational logic that is predetermined at the time the processor is built to implement, without memory, a decision function whose output is the second prediction based on the taken/not-taken history;

a multiplexer having an input coupled to the outputs of the SCBP and LBHP logic and a select input coupled to receive the hit/miss indication and in response provide (1) the second prediction if there is a hit and (2) the first prediction if there is a miss; and logic to update a replacement field for said matching entry only if the first prediction is incorrect and to update a history field for said matching entry with the outcome of an executed branch instruction only if the first prediction is incorrect and the second prediction is correct.

6. The processor of claim 5 further comprising:

address hash logic coupled between the IP generator and the inputs of the SCBP and LBHP logic to provide a plurality of index values to at least one of the SCBP and LBHP logic.

7. The processor of claim 5 wherein the SCBP logic includes a bimodal predictor.

8. The processor of claim 5 wherein the LBHP logic includes a plurality of local branch history tables each to provide a tag and a taken/not-taken history associated with the tag in response to a hit, compare logic coupled to each of the plurality of tables to determine the hit/miss indication, a history multiplexer coupled to each of the plurality of tables to provide the history for the hit, and wherein the combinational logic is coupled to an output of the history multiplexer to provide the second taken/not-taken prediction.

9. The processor of claim 5 further comprising:

an instruction fetch stage of a pipeline; and an instruction decode stage of the pipeline, and wherein the prediction at the output of the multiplexer is available when the address is being processed by an instruction decode stage of a pipeline.

10. The processor of claim 9 wherein the decode stage is capable of determining a target address of a branch instruction located at the address, the processor further comprising:

control logic coupled to load the IP generator with the branch target address if an output of the multiplexer indicates, for the address, that a branch is predicted to be taken.

11. The processor of claim 5 wherein the address points to a cache line having a plurality of instructions.

12. An apparatus comprising:

means for providing an address of at least one instruction;

means for providing a first taken/not-taken branch prediction based upon the current state of a state machine and responsive to the address;

local branch history prediction (LBHP) logic having an input coupled to the address providing means and capable of providing (1) a second taken/not-taken prediction at an output responsive to the address resulting in a hit, and (2) a hit/miss indication for the address, wherein the LBHP logic includes at least one local branch history prediction table to provide a taken/not-taken history from a history field of a matching entry in said table in response to said hit and means for generating, without memory the second prediction based on the taken/not-taken history; and a multiplexer having an input coupled to the first prediction means and the output of the LBHP logic and a select input coupled to receive the hit/miss indication and in response provide (1) the second prediction if there is a hit and (2) the first prediction if there is a miss;

means for updating said history field, with the outcome of an executed branch instruction that is pointed to by said address, only if the first prediction is incorrect and the second prediction is correct.

13. The apparatus of claim 12 further comprising:

means for encoding the address to provide a plurality of index values to at least one of the first prediction means and the LBHP logic.

14. The apparatus of claim 12 wherein the LBHP logic includes a plurality of local branch history prediction tables each to provide a tag and a taken/not-taken history associated with the tag in response to a hit, compare logic coupled to each of the plurality of tables to determine the hit/miss indication, a history multiplexer coupled to each of the plurality of tables to provide the history for the hit, and wherein the generating without memory means is coupled to an output of the history multiplexer to provide the second taken/not-taken prediction.

15. The apparatus of claim 12 further comprising:
means for fetching at least one instruction at the address; and
means for decoding the at least one instruction, wherein at least one of the first and second predictions is available when the at least one instruction is being decoded.

16. The apparatus of claim 15 wherein the at least one instruction is a branch, the apparatus further comprising:
means for determining a target address of the branch; and
means for fetching at least one instruction at the target address if at least one of the first and second predictions indicates that the branch is to be taken.

17. A method comprising:
providing a first taken/not-taken prediction responsive to an address using a saturating counter branch predictor;
providing a second taken/not-taken prediction responsive to the address resulting in a hit in a local branch history table, wherein the second prediction is generated using a decision function that is provided with a taken/not-taken history value from a history field of a matching entry of the local branch history table and produces, as output, the second prediction, the decision function being implemented by combinational logic that has no counter or state machine;
selecting for the address one of the first prediction and the second prediction depending on whether or not the address resulted in said hit;
updating a replacement field, for an existing entry in the local branch history table that includes a history field containing a plurality of taken/not-taken outcomes of one or more previously executed branch instructions associated with said address, only if the first prediction is incorrect; and
updating said history field based on an outcome of an executed branch instruction that is pointed to by said address, only if the first prediction is incorrect and the second prediction is correct.

* * * * *